United States Patent [19]

Ostertag

[11] Patent Number: 4,826,537
[45] Date of Patent: May 2, 1989

[54] LAMELLAR PIGMENTS OF THE GENERAL FORMULA $Mn_X\text{-}Al_Y Fe_{2-(X+Y)}O_3$

[75] Inventor: Werner Ostertag, Gruenstadt, Fed. Rep. of Germany

[73] Assignee: BASF Aktiengesellschaft, Ludwigshafen, Fed. Rep. of Germany

[21] Appl. No.: 111,602

[22] Filed: Oct. 23, 1987

[51] Int. Cl.$^4$ ............................................. C09C 1/22
[52] U.S. Cl. ...................................... 106/459; 106/415
[58] Field of Search ...................... 106/304, 415, 459; 423/599

[56] References Cited

U.S. PATENT DOCUMENTS

| | | | |
|---|---|---|---|
| 3,655,418 | 4/1972 | Hardy et al. | 106/304 |
| 3,987,156 | 10/1975 | Nobuoka | 423/633 |
| 4,285,726 | 8/1981 | Hund et al. | 106/304 |
| 4,289,745 | 9/1981 | Patil | 106/304 |
| 4,289,746 | 9/1981 | Hayakawa et al. | 423/633 |
| 4,373,963 | 2/1983 | Uenishi et al. | 106/304 |
| 4,404,254 | 9/1983 | Franz et al. | 106/304 |
| 4,676,838 | 6/1987 | Franz et al. | 106/304 |
| 4,680,130 | 7/1987 | Hibst | 106/304 |

FOREIGN PATENT DOCUMENTS

| | | |
|---|---|---|
| 0068311 | 6/1985 | European Pat. Off. . |
| 0541768 | 1/1932 | Fed. Rep. of Germany . |
| 0658020 | 3/1938 | Fed. Rep. of Germany . |
| 2056042 | 3/1971 | Fed. Rep. of Germany . |
| 0014382 | 8/1980 | Fed. Rep. of Germany . |
| 3019404 | 11/1980 | Fed. Rep. of Germany . |
| 0180881 | 5/1986 | Fed. Rep. of Germany . |
| 0638200 | 3/1928 | France . |
| 0049667 | 3/1982 | Japan .................................. 106/304 |
| 0298926 | 11/1928 | United Kingdom . |
| 2028784 | 3/1980 | United Kingdom . |

Primary Examiner—Paul Lieberman
Assistant Examiner—Christine A. Skane
Attorney, Agent, or Firm—Keil & Weinkauf

[57] ABSTRACT

Lamellar pigments are based on iron oxide of the general formula $Mn_X Al_Y Fe_{2-(X+Y)}O_3$, where X is from 0.01 to 0.06 and Y is from 0 to 0.2. The pigments are prepared by hydrothermal treatment of an aqueous suspension which contains an iron hydroxide or iron oxide hydroxide, and an alkali metal hydroxide and/or alkali metal carbonate, in the presence of a manganese compound which is soluble in the reaction medium and in the presence or absence of an aluminum compound.

The pigments are used for pigmenting coatings, printing inks, finishes, plastics, ceramic surfaces, glasses and cosmetic products.

6 Claims, No Drawings

LAMELLAR PIGMENTS OF THE GENERAL FORMULA $Mn_X$-$Al_Y$$Fe_{2-(X+Y)}O_3$

The present invention relates to lamellar pigments the type $Mn_XAl_YFe_{2-(X+Y)}O_3$, which belong to the group consisting of the effect pigments or luster pigments.

The optical effect of the effect pigments or luster pigments is due to reflection in specific directions from flat, oriented, highly refractive pigment particles. The color properties of the pigments play a minor role. The mean particle diameter or the effect or luster pigments is much larger than that of pigments whose action is based on scattering and absorption. It determines the nature of the effect, which appears soft and silky for lamellae having a smaller diameter and exhibits a typical sparkle in the case of lamellae of larger diameter.

Effect pigments may be metallic or oxidic. Lamellar aluminum pigments are well known. Oxide effect pigments have recently become increasingly important, for example for automotive finishes, where they are a visually attractive alternative to the long-known aluminum pigments. Oxide effect pigments are also used for coloring plastics, in printing and in the cosmetics sector, i.e. in all areas where high gloss is desirable. Such oxide effect pigments are, for example, lamellar iron oxide pigments or iron oxide mixed-phase pigments which are prepared by a hydrothermal method and in which the pigment particles are single crystals.

The development of the conventional hydrothermally prepared lamellar iron oxide and iron oxide mixed phases for use as effect pigments can be followed from the large number of patent Nos.: FR-A 638,200, DE-C 541,768 and 658,020, DE-A 2,056,042, GB-A 2,028,784 and DE-A 3,019,404 describe the preparation of lamellar $\alpha$-$Fe_2O_3$ pigments by hydrothermal treatment of iron hydroxide or iron oxide hydroxide, the lamellar pigments obtained having various particle geometries and sizes, and hues from yellowish red to violet, depending on the conditions.

The disadvantages of such pure hematite pigments are the insufficietly high diameter/thickness ratio of the products and the tedious production process for hematite pigments having a fairly large mean particle diameter. The possibility, described in particular in DE-A No. 2,056,042, for producing very large lamellae by means of very high alkali concentrations is not of practical importance, owing to corrosion.

EP-A No. 14,382 describes lamellar iron oxide pigments and their preparation by hydrothermal methods, the said pigments containing 0.1–12% by weight of one or more of the oxides of the elements of main groups and subgroups IV, V and/or VI and/or subgroup II of the periodic table of elements. Silica is of central importance here and, like the other abovementioned elements, is said to make it possible for the increase in thickness of the lamellae and the growth of the lamellae to be controlled separately. The increase in the diameter of the lamellae is determined in particular by the pH of the suspension, whereas the thickness of the lamellae is influenced by the stated oxides. In spite of an improved diameter/thickness ratio of the pigments thus prepared, only relatively small mean diameters of the lamellar products are obtained.

European patent No. 68,311 and U.S. Pat. No. 4,373,963 describe lamellar mixed-phase pigments having the composition $Al_X/Fe_{2-X}O_3$. These pigments too are prepared by the hydrothermal reaction, from an aqueous suspension of iron(III) hydroxide or iron(III) oxide hydroxide, sodium aluminate and sodium hydroxide solution. Compared with the lamellar hematite pigments described above, the pigments are distinguished by the fact that their hue permits paler overcoloring and that they have comparatively larger diameters and higher diameter/thickness ratios of the individual particles. Moreover, the mean particle diameter of these pigments is limited to a maximum value of about 12 $\mu$m unless extremely long residence times and very high alkali contents are accepted in the hydrothermal treatment. The former presents problems from the point of view of production engineering, giving low space-time yields, where the latter gives rise to problems in relation to material technology.

European Patent No. 180,881 describes a process for the preparation of a lamellar $\alpha$-$Fe_2O_3$ pigment having a mean particle diameter of up to 20 $\mu$m and a mean diameter/thickness ratio of 20–100, the special feature of this process being the addition of specially prepared active lamellar $\alpha$-iron oxide nuclei to the initial iron(III) hydroxide-containing suspension before the hydrothermal treatment. The disadvantage of this process is the special process step for the preparation of active $\alpha$-iron oxide nuclei, which is carried out before the hydrothermal reaction and is technically demanding and considerably complicates the overall process.

In JA-A No. 80 16,978, lamellar $\alpha$-iron oxides, which in turn are obtained from a hydrothermal reaction, are used as nuclei for the preparation of a coarser lamellar pigment. However, this procedure leads to the formation of numerous undesirable agglomerates, so that pigments prepared in this manner are not suitable for applications entailing high requirements.

It is an object of the present invention to provide lamellar pigments based on iron oxides or iron oxide-containing mixed-phase oxides, which do not have the disadvantages of the known pigments and can be prepared in a simple manner during short residence times in a single-stage process, and whose mean particle diameter can be controlled.

We have found that this object is achieved by lamellar pigments based on iron oxide of the general formula $Mn_XAl_YFe_{2-(X+Y)}O_3$, where X is from 0.01 to 0.06 and Y is from 0 to 0.2.

The novel pigments can be prepared in a simple manner in a hydrothermal process, in which an aqueous suspension of iron(III) hydroxide or iron(III) oxide hydroxide is subjected to a treatment at above 120° C. in the presence of an alkali metal hydroxide or carbonate and in the presence of a manganese compound which is soluble in the reaction medium. In this procedure, manganese is, surprisingly, incorporated into the lamellar ternary oxide mixed-phase pigment of the general formula $Mn_XAl_Y$-$Fe_{2-(X+Y)}O_3$ which forms.

Suitable manganese compounds which are soluble in the reaction medium are the compounds of hexavalent and, in particular, heptavalent manganese, eg. potassium permanganate.

As suitable ion hydroxide or iron oxide hydroxide in addition to the gel-like $Fe(OH)_3$, is $\alpha$-FeOOH and $\gamma$-FeOOH. The concentration or the solids content of the suspension is advantageously chosen so that the suspension can be handled without difficulties; in general, the suspensions contain from 1 to 20, preferably from 1 to 10, % by weight, based on water, of iron hydroxide or iron oxide hydroxide.

The amounts of manganese compounds which are soluble in the reaction medium are chosen so that the atomic ratio of Mn to Fe is not less than the atomic ratio in the pigment to be prepared. In principle, it is found that, under otherwise identical reaction coniitions, the manganese content in the ready-prepared pigment as well as the mean particle diamter of the pigment increases with increasing manganese concentration in the suspension, while the diameter/thickness ratio remains roughly constant. It is therefore possible, by selecting the concentration, of the manganese compound in the suspension, to prepare in a controlled manner pigments having a desired particle diameter, which may be varied from 6 to 65 $\mu$m.

An important advantage is that it is not necessary to carry out the preparation of novel pigments in a highly alkaline reaction medium. Hence, the normality of the suspensions with respect to alkali metal hydroxide and/or alkali metal carbonate need not be higher than 2 N in order to obtain the pigments in acceptable reaction times.

The temperature during the hydrothermal synthesis should advantageously be higher than 170° C., particularly advantageously from 250° to 360° C.

Where the novel pigments are also intended to contain aluminum, suspensions containing an alkali metal aluminate are used. Of course, this need not be used as such; it is also possible to employ alumina, which is converted to an alkali metal aluminate under the hydrothermal conditions, or an aluminum oxide hydroxide. As in the case of the Mn/Fe ratio, the Al/Fe atomic ratio in the reactants to be used must also be no lower than the Al/Fe atomic ratio in the pigment to be prepared. Advantageously, an excess of Al is chosen, the excess Al remaining in solution when the reaction is complete.

If the starting suspension does not contain any aluminum, the addition of a relatively small amount of manganese is sufficient to produce lamellae of appropriate size. The thickness of the lamellae increases with increasing diameter of the lamellae, the diameter/thickness ratio not changing significantly in the $Mn_xAl_yFe_{2-(x+y)}O_3$ system. Only when aluminum is absent does the diameter/thickness ratio decrease with increasing manganese concentration in the suspension, which can be explained by the fact that hydrothermally prepared lamellar aluminum-free iron oxide pigment has from the outset much thicker lamellae than hydrothermally prepared aluminum-containing iron oxide pigment. In general, the diameter/thickness ratio of the manganese-containing hydrothermally prepared oxide pigments is very high. In the $Mn_xAl_y-Fe_{2-(x+y)}O_3$ system, it is 100 $\pm/-20$. The possibility of preparing particularly thin lamellae is an outstanding advantage of the pigments according to the invention.

The duration of the hydrothermal treatment, i.e. the time taken to heat the mixture to the particular temperature specified, and the residence time at this temperature, including any cooling to below 100° C., is in general from 30 to 90 minutes. Longer residence times are possible but generally result in a decrease in the diameter/thickness ratio of the pigments.

The novel mixed-phase oxide pigments crystallize with the hematite lattice. The phase range, i.e. the ranges of X and Y in the general formula $Mn_xAl_yFe_{2-(x+y)}O_3$, are no more than 0.06 and 0.2 and are thus not very large. Increasing the manganese or aluminum concentrations in the suspensions to be treated hydrothermally leads to inhomogeneities in the resulting pigments, i.e. to crystalline impurities in the end product, which, owing to their scattering behavior, have an adverse effect on the optical properties of the lamellar effect pigments.

The novel, metallic luster pigments have small particle diameters of about 10 $\mu$m and a reddish yellow color, which shifts toward violet with increasing diameter. They are used for pigmenting finishes, printing inks, plastics, coatings, ceramic surfaces, glasses and cosmetic products.

In the Examples below, percentages are by weight, unless stated otherwise.

EXAMPLE 1

0.23 g/l of $KMnO_4$ is added to a thoroughly stirred suspension of 6.25 g of $\alpha$-FeOOH, prepared by oxidation of $FeSO_4$ with air in a two-stage process and having a BET surface area of 42 m$^2$/g, 6.98 g of $Al(OH)_3$, 6.05 g of NaOH and 150 of $H_2O$, and the stirred mixture is brought to 220° C. in the course of 30 minutes (heating phase) and then to 305° C. in a further 30 minutes (reaction phase), in an electrically heated stirred autoclave having a capacity of 300 ml. The reaction mixture is then cooled to below 100° C. in under 10 minutes. The solid reaction product is separated off from the alkaline solution, washed with hot water and dried at 110° C. in a drying oven. The resulting pigment has a dark violet color and high luster and consists of lamellar crystals having smooth crystal faces, as is evident from scanning electron micrographs. The mean particle diameter is determined as 18 $\mu$m by Cilas laser diffraction granulometry. The mean thickness of the lamellae is determined as 0.2 $\mu$m from measurements of the BET specific free surface area of the pigment. This gives a diameter/thickness ratio of 90 for the lamellae.

Wet-chemical analyses showed that the pigment has an Mn content of 1.2%, an Al content of 2.2% and an Fe content of 65.6%. This gives a pigment composition corresponding to the formula $Mn_{0.034}Al_{0.128}Fe_{1.838}O_3$. X-ray photographs show that the product is present as a single phase and has the hematite structure.

When the pigment is milled with an alkyd/melamine resin according to DIN Draft 53,238 on a disk mill and the dispersion is applied to a substrate by knife-coating, the resulting pigmented coating film has a pronounced metallic effect (sparkle and flop). An opaque finish produced on a metal sheet by spraying has the following properties, measured in accordance with the Cielab color system: Lightness $L^*$ =37.0, chroma $C_{ab}$=14.5, hue angle $H^o$=33.2 (Measuring instrument: Hunterlab Model D-25, standard illuminant C, observation angle 2°, measuring angle 0°, illumination angle 45° with exclusion of the luster component).

EXAMPLE 2

A stirred mixture of 6.33 g of $\alpha$-FeOOH, having a BET surface area of 45 m$^2$/g and prepared by oxidation of an aqueous $FeSO_4$ solution in a two-stage process, 8.48 g of $NaAlO_2$, 4.2 g of KOH, 0.15 g of $KMnO_4$ and 150 g of $H_2O$ is heated to 310° C. in the course of 30 minutes in an electrically heated autoclave having a capacity of 300 ml. After a residence time of 10 minutes, the mixture is cooled as described in Example 1. The solid lamellar reaction product is separated from the aqueous solution, washed with hot water and dried at 105° C. in a drying oven.

The resulting pigment has a brownish yellow color, exhibits metallic luster and consists of lamellar crystals. Scanning electron micrographs show smooth, clean, crystal faces of single crystals. The mean diameter of the crystalline particles is 10 μm and the BET specific surface area is 3.8 m²/g, giving a mean particle thickness of 0.1 μm.

Analyses gave a chemical composition of the product corresponding to the formula $Mn_{0.02}Al_{0.18}Fe_{1.80}O_3$. X-ray photographs show that the product is present as a single phase and has the X-ray lines of hematite.

When the pigment is milled with an alkyd/melamine resin according to DIN Draft 53,238 on a disk mill and the dispersion is applied by knife-coating and dried, the resulting film exhibits a metallic effect which has a particularly pronounced flop. An opaque coating produced on a metal sheet by spraying has the following properties measured according to Cielab color system, using the Hunter color measuring apparatus: $L^* = 46.5$, $C_{ab}^* = 27.79$ and $H^o = 47.79$.

Pigmented coating films prepared as described in Example 2 have a pronounced metallic effect with the visual impression of great depth. An opaque coating produced on a metal sheet by spraying has the following values measured according to Cielab color system: $L^* = 34.14$, $C^{ab*} = 6.90$ and $H^o = 12.81$

EXAMPLES 4 TO 20

Examples 4 to 20 are carried out in a similar manner to Example 1. In all of these examples, the mixture is heated from room temperature to 220° C. in the course of 30 minutes. In Examples 4–16, as in Example 1, the mixture is then heated to 305° C. in the course of a further 30 minutes, after which it is cooled as described in Example 1. In Examples 17–20, after heating to 305° C. in the course of 30 minutes, a residence time of 30 minutes at 305° C. is maintained before cooling is effected. The results of the experiments are summarized in Table 1. All reaction products are lamellar, as is evident from the scanning electron micrographs, and have the X-ray pattern of hematite.

Preparation of lamellar $Mn_XAl_YFe_{2-(X+Y)}O_3$ pigments using $MnO_4^-$ ions.

| Example | FeOOH | Al(OH)₃ | NaOH | KMnO₄ | H₂O | Product composition | ⌀ (μ)¹ | d (μ)² | ⌀/d |
|---|---|---|---|---|---|---|---|---|---|
| 4 | 6.25 | 6.98 | 6.0 | 0.08 | 150 | $Mn_{0.012}Al_{0.16}Fe_{1.828}O_3$ | 8.0 | 0.08 | 100 |
| 5 | 6.25 | 6.98 | 6.0 | 0.10 | 150 | $Mn_{0.015}Al_{0.17}Fe_{1.815}O_3$ | 9.3 | 0.09 | 103 |
| 6 | 6.25 | 6.98 | 6.0 | 0.12 | 150 | $Mn_{0.018}Al_{0.18}Fe_{1.802}O_3$ | 9.3 | 0.085 | 109 |
| 7 | 6.25 | 6.98 | 6.0 | 0.14 | 150 | $Mn_{0.020}Al_{0.19}Fe_{1.790}O_3$ | 9.9 | 0.103 | 96 |
| 8 | 6.25 | 6.98 | 6.0 | 0.16 | 150 | $Mn_{0.024}Al_{0.18}Fe_{1.796}O_3$ | 10.1 | 0.108 | 93 |
| 9 | 6.25 | 6.98 | 6.0 | 0.18 | 150 | $Mn_{0.028}Al_{0.17}Fe_{1.802}O_3$ | 13.2 | 0.140 | 94 |
| 10 | 6.25 | 6.98 | 6.0 | 0.22 | 150 | $Mn_{0.034}Al_{0.16}Fe_{1.806}O_3$ | 17.5 | 0.19 | 92 |
| 11 | 6.25 | 6.98 | 6.0 | 0.30 | 150 | $Mn_{0.042}Al_{0.15}Fe_{1.808}O_3$ | 25.0 | 0.26 | 96 |
| 12 | 6.25 | 6.98 | 6.0 | 0.40 | 150 | $Mn_{0.050}Al_{0.15}Fe_{1.800}O_3$ | 35.2 | 0.38 | 93 |
| 13 | 6.25 | 6.98 | 6.0 | 0.50 | 150 | $Mn_{0.057}Al_{0.14}Fe_{1.803}O_3$ | 44.0 | 0.44 | 100 |
| 14 | 6.25 | 6.98 | 6.0 | 0.56 | 150 | $Mn_{0.060}Al_{0.14}Fe_{1.800}O_3$ | 49.2 | 0.51 | 96 |
| 15 | 6.25 | 4.31 | 6.0 | 0.12 | 150 | $Mn_{0.020}Al_{0.08}Fe_{1.900}O_3$ | 12.2 | 0.30 | 41 |
| 16 | 6.25 | 0.20 | 6.0 | 0.11 | 150 | $Mn_{0.019}Al_{0.005}Fe_{1.976}O_3$ | 10.1 | 0.39 | 26 |
| 17 | 6.25 | 0 | 6.0 | 0.11 | 150 | $Mn_{0.018}Fe_{1.982}O_3$ | 10.0 | 0.39 | 26 |
| 18 | 6.25 | 0 | 6.0 | 0.20 | 150 | $Mn_{0.032}Fe_{1.968}O_3$ | 41.2 | 0.42 | 98 |
| 19 | 6.25 | 0 | 6.0 | 0.30 | 150 | $Mn_{0.041}Fe_{1.959}O_3$ | 58.0 | 0.53 | 109 |
| 20 | 6.25 | 0 | 6.0 | 0.40 | 150 | $Mn_{0.053}Fe_{1.947}O_3$ | 62.6 | 0.55 | 114 |
| Comparative Experiment | 6,25 | 6.98 | 6.0 | 0 | | $Al_{0.18}Fe_{1.82}O_3$ | 8.0 | 0.086 | 93 |

¹Diameter of lamellae obtained from laser diffraction measurements using CILAS granulometer
²Thickness of lamellae calculated from BET surface area

EXAMPLE 3

6.67 g of α-FeOOH, prepared by oxidation of an aqueous FeSO₄ solution with air by a two-stage process and having a BET surface area of 43 m²/g, is mixed thoroughly with 7.0 g of Al(OH)₃, 6.0 g of NaOH, 0.40 g of KMnO₄ and 155 ml of H₂O, and the stirred mixture is heated to 225° C. in the course of 30 minutes and to 310° C. in a further 30 minutes, in a 300 ml stirred autoclave. Thereafter, the mixture is cooled as described in Example 1. The reaction product is separated from the aqueous solution by filtration, washed with hot water and dried at 105° C. in a drying oven. The resulting pigment has a dark violet color. The sparkling single crystals in the powder are detectable by the naked eye. Scanning electron micrographs show well formed crystalline lamellae having a high diameter/thickness ratio. Cilas measurements give a mean particle diameter of 34.1 μm. From the BET value of 0.95 m²/g, the mean particle thickness is calculated as 0.4 μm.

Analyses gave a pigment composition corresponding to the formula $Mn_{0.05}Al_{0.15}Fe_{1.80}O_3$. X-ray photographs indicate a single-phase crystalline product which exhibits the diffraction lines of hematite.

I claim:

1. A lamellar pigment based on iron oxide of the formula $Mn_XAl_YFe_{2-(X+Y)}O_3$ where X is 0.01–0.06 and Y is 0–0.2.

2. A process for the preparation of a lamellar pigment of the formula $$Mn_XAl_YFe_{2-(X+Y)}O_3$$

where X is 0.01–0.06 and Y is 0–0.2, which comprises:
heating an aqueous suspension containing iron(III) oxide or iron(III) oxide hydroxide at a temperature above 170° C. in the presence of an alkali metal hydroxide and/or carbonate and in the presence of a manganese compound soluble in the reaction medium, whereby the hydrothermal treatment forms the lamellar pigment;
separating the pigment from the reaction solution; and
washing and drying the pigment.

3. The process of claim 2, wherein an alkali metal permanganate is used as the manganese compound which is soluble in the reaction medium.

4. The process of claim 2, wherein the content of alkali metal hydroxide and/or carbonate in the suspension does not exceed 2 N.

5. The process of claim 2, wherein a temperature of from 250° to 360° C. is maintained in the hydrothermal treatment.

6. The process of claim 2, wherein the suspension contains sodium aluminate.

* * * * *